(12) United States Patent
Zirwas (10) Patent No.: US 7,042,957 B1
(45) Date of Patent: May 9, 2006

(54) METHOD AND COMMUNICATION SYSTEM FOR TRANSMITTING INFORMATION WITH THE AID OF A MULTICARRIER METHOD

(75) Inventor: Wolfgang Zirwas, Groebenzell (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/868,237

(22) PCT Filed: Dec. 2, 1999

(86) PCT No.: PCT/DE99/03865

§ 371 (c)(1),
(2), (4) Date: Jun. 15, 2001

(87) PCT Pub. No.: WO00/36769

PCT Pub. Date: Jun. 22, 2000

(30) Foreign Application Priority Data

Dec. 15, 1998 (DE) ................ 198 57 821

(51) Int. Cl.
H04L 27/04 (2006.01)
H04L 27/12 (2006.01)
H04L 27/20 (2006.01)

(52) U.S. Cl. ............ 375/295; 375/292; 375/260; 375/332

(58) Field of Classification Search ............... 375/295, 375/222, 260, 332
See application file for complete search history.

(56) References Cited

U.S. PATENT DOCUMENTS

| 5,627,863 | A | * | 5/1997 | Aslanis et al. | 375/357 |
| 5,673,290 | A | | 9/1997 | Cioffi | |
| 5,790,514 | A | * | 8/1998 | Marchok et al. | 370/208 |
| 5,844,949 | A | * | 12/1998 | Hershey et al. | 375/346 |
| 6,075,821 | A | * | 6/2000 | Kao et al. | 375/260 |
| 6,088,387 | A | * | 7/2000 | Gelblum et al. | 375/222 |
| 6,389,062 | B1 | * | 5/2002 | Wu | 375/222 |
| 6,603,811 | B1 | * | 8/2003 | Dobson et al. | 375/232 |

FOREIGN PATENT DOCUMENTS

| EP | 0 851 653 | 7/1998 |
| WO | WO 96/28940 | 9/1996 |
| WO | WO 98/44703 | 10/1998 |

* cited by examiner

Primary Examiner—Kevin Burd
Assistant Examiner—Juan Alberto Torres
(74) Attorney, Agent, or Firm—Bell, Boyd & Lloyd LLC (57) ABSTRACT

To transmit information with the aid of a transmit signal exhibiting a number of frequency-specific subcarriers from a first unit to a second unit via a transmission medium, the frequency-selective transmission characteristics of the transmission medium are determined in the first unit and then the subcarriers of the transmit signal are adapted to the transmission characteristics determined. All subcarriers of the transmit signal can be advantageously modulated with the same number of modulation levels as a result of which maximum utilization of the transmission resources of the transmission medium is achieved.

20 Claims, 2 Drawing Sheets

METHOD AND COMMUNICATION SYSTEM FOR TRANSMITTING INFORMATION WITH THE AID OF A MULTICARRIER METHOD

BACKGROUND OF THE INVENTION

1. Field of the Invention

The present relates, generally, to a method and communication system for transmitting information with the aid of a multicarrier method and, more specifically, to such a method and system wherein maximum utilization of available transmission resources of a transmission medium is achieved during the transmission of information via the transmission medium which has frequency-selective transmission characteristics.

2. Description of the Prior Art

In wireless communication networks based on radio channels, especially in point-to-multipoint radio feeder networks (also called "radio in the local loop" or, respectively, "RLL"), a number of network terminating units are, in each case, connected to a base station (also called "radio base station" or, respectively "RBS") via one or more radio channels. In telcom report No. 18 (1995), vol. 1 "Drahtlos zum Freizeichen" [Wireless to the ringing tone] page 36, 37, for example, a wireless feeder network for the wireless speech and data communication is described. The communication system described represents an RLL subscriber line in combination with a modern broadband infrastructure, e.g. "fiber to the curb", which can be implemented within a short time and without great expenditure instead of running wire-connected local loops. The network terminating units RNT allocated to the individual subscribers are connected to a higher-level communication network, for example to the ISDN-oriented landline network, via the "radio channel" transmission medium and the base station RBS.

Due to the increasing spread of multimedia applications, high-bit-rate data streams must be transmitted rapidly and reliably via communication networks, especially via wireless communication networks or, respectively, via mobile radio systems, and high demands are made on the radio transmission systems which are based on a transmission medium "radio channel" which is susceptible to interference and difficult to assess with regard to the quality of transmission. A transmission method for transmitting broadband data streams, such as video data streams, is represented by, for example, the OFDM (orthogonal frequency division multiplexing) transmission method based on a so-called multicarrier method. In the OFDM transmission technology, the information to be transferred or, respectively, the data stream to be transferred is divided or, respectively, converted to parallel form, to a number of sub-channels or subcarriers within the radio channel. The information to be transferred in each case being transmitted at a relatively low data rate but in parallel in relatively superimposed form. The OFDM transmission technology is used, for example, in digital terrestrial radio (also called digital audio broadcasting DAB) and for digital terrestrial television (also called digital terrestrial video broadcasting DTVB).

The OFDM transmission method is described in greater detail in the printed document "Mitteilungen der TU-Braunschweig, Mobilfunktechnik für Multimedia-Anwendungen" (Information as the Braunschweig technical university, mobile radio technology for multimedia applications), Professor H. Rohling, volume XXXI, issue 1-1996, in figure 6, page 46. In this method, a serial/parallel conversion is performed for the modulation of, for example, the n subcarriers on the basis of a serial data stream in the transmitter, a binary code word with word length k (the word length k being dependent on the modulation method used) being formed in each case for the ith OFDM block in time with block length T' and the jth subcarrier. From the code words formed, the corresponding complex modulation symbols, also called transmit symbols in the text which follows, are formed with the aid of a transmitter-specific modulation method, wherein one transmit symbol is allocated to each of the k subcarriers at any time i. The spacing of the individual subcarriers is defined by $\Delta f=1-T'$ which guarantees that the individual subcarrier signals are orthogonal within the useful interval [0, T']. By multiplying the oscillations of the individual subcarriers by the corresponding modulation symbols or transmit symbols and subsequently adding the modulation products formed, the corresponding discrete-time transmit signal is generated for the ith OFDM block in time. This transmit signal is calculated in sampled, i.e. in discrete-time form by an inverse discrete Fourier transform (IDFT) directly from the modulation symbols or transmit symbols of the individual subcarriers considered. To minimize intersymbol interferences, each OFDM block is preceded by a guard interval $T_G$ in the time domain which causes an extension of the discrete-time OFDM signal in the interval $[-T_G, 0]$; compare "Mitteilungen der TU-Braunschweig, Mobilfunktechnik für Multimedia-Anwendungen", figure 7. The inserted guard interval $T_G$ advantageously corresponds to the maximum delay difference occurring between the individual propagation paths occurring during the radio transmission. By removing the added guard interval $T_G$ at the receiver end, a disturbance of the ith OFDM block by, for example, the adjacent OFDM signal in time at time i−1 is avoided, so that the transmit signal is received in interval [0, T'] over all indirect paths and the orthogonality between the subcarriers is retained to its full extent in the receiver. In the case of a large number of subcarriers, for example n=256 subcarriers, and correspondingly long symbol periods $T=T'+T_G$, the period $T_G$ is small compared with T so that the insertion of the guard interval effectively does not significantly impair the bandwidth and only a small overhead is produced. After the transmit signal received at the input of the receiver is sampled in the baseband by an A/D converter, and after the useful interval has been extracted, i.e. after the guard interval $T_G$ has been eliminated, the received transmit signal is transformed into the frequency domain with the aid of a discrete Fourier transform (DFT); i.e., the received modulation symbols or, respectively, the received receive symbols are determined. From the receive symbols determined, the corresponding receive code words are generated via a suitable demodulation method, and from these the received serial data stream is formed by parallel/serial conversion. Avoiding intersymbol interference in OFDM transmission methods considerably reduces the computing effort in the respective receiver as a result of which the OFDM transmission technology is used, for example, for the terrestrial transmission of digital television signals; for example, the transmission of broadband data streams with a transmission rate of 34 Mbit/s per radio channel.

To transmit the serial data stream to be transmitted with the aid of the OFDM transmission method, absolute or, respectively, differential modulation methods and corresponding coherent or, respectively, incoherent demodulation methods are used. Although the orthogonality of the subcarriers is retained in its full extent by using the OFDM transmission method when transmitting the transmit signal formed via the "radio channel" transmission medium, both the phase and the amplitude of the transmitted discrete-frequency and frequency-selective transmit signals are changed by the transmission characteristics of the radio channel. The influence of the radio channel on amplitude and phase takes place subcarrier-specifically on the individual subcarriers which in each case have a very narrow bandwidth. In addition, noise signals are additively superimposed on the transmitted useful signal. When coherent demodulation methods are used, a channel estimation is required which depends on considerable technical and economic expenditure for its implementation depending on the quality requirements and which also reduces the performance of the transmission system. Advantageously, differential modulation methods and corresponding incoherent demodulation methods are used in which any elaborate radio channel estimation can be dispensed with. In the case of differential modulation methods, the information to be transmitted is not transmitted directly by selection of the modulation symbols or the discrete-frequency transmit symbols but by changing the discrete-frequency transmit symbols, which are adjacent in time, on the same subcarrier. Examples of differential modulation methods are the 64-level 64-DPSK (differential phase shift keying) and the 64-DAPSK (differential amplitude and phase shift keying) methods. In the 64-DAPSK, both the amplitude and simultaneously the phase are differentially modulated.

In the case of large delay differences between the individual signal paths, i.e. in the case of strong multipath propagation, different transmission-channel-related attenuations may occur between the individual received subcarriers with attenuation differences of up to 20 dB and more. The received subcarriers having high attenuation values or, respectively, the subcarriers having low S/N values (also called the signal power/noise power ratio) have a very large symbol error rate as a result of which the total bit error rate rises considerably over all subcarriers. In the case of subcarriers modulated with the aid of coherent modulation methods, it is already known to correct the attenuation losses caused by the frequency-selective transmission characteristics of the transmission medium (also called the transfer function H(f)) with the aid of the inverse transfer function (also called 1/H(f)) at the receiving end. The frequency-selective attenuation losses are then determined, for example, by evaluating reference pilot tones transmitted and in each case are allocated to certain subcarriers. This method for equalizing the transmission channel at the receiving end, however, causes a great increase in noise in the subcarriers with low S/N values. The bit error rate caused by the increase in noise in subcarriers with low S/N values cannot even be improved by introducing channel coding so that the total transmission channel capacity of the frequency-selective transmission medium, which is possible over all subcarriers, is not achieved in spite of equalization of the transmission channel at the receiving end.

In known methods for improving the transmission quality in multicarrier systems as are known, for example, from the document "Comparison between adaptive OFDM and single carrier modulation with frequency domain equalization", A. Czylwik, IEEE Vehicular Technology Conference, USA, New York, vol. Conf. 47, 1997, pp. 865–869, XP000736731, ISBN: 0-77803-3660-7, the transfer function of the channel is estimated via information already transmitted. It is assumed here that the characteristics of the radio channel change only slowly in time. The estimated transfer function is transmitted back to the transmitter from the receiving station via signaling stations.

In a multicarrier method according to U.S. Pat. No. 5,673,290, transmission parameters of a communication line are measured. The modulation method of each carrier is then adapted to the measured parameters.

The present invention is thus, directed toward achieving maximum utilization of the available transmission resources of the transmission medium during the transmission of information via a transmission medium having frequency-selective transmission characteristics. In particular, it is intended to achieve maximum utilization of the transmission resources of all multipath components or subcarriers when using a multicarrier method.

SUMMARY OF THE INVENTION

In the method according to the present invention for transmitting information via a transmission medium having certain transmission characteristics with the aid of a multicarrier method, the information to be transmitted is transmitted by a transmit signal having a number of frequency-specific subcarriers to a second unit via the transmission medium. An important aspect of the method according to the present invention is that frequency-selective transmission characteristics of the transmission medium are determined in the first unit and then the frequency-specific subcarriers of the transmit signal are adapted to the frequency-selective transmission characteristics of the transmission medium which have been determined.

A key advantage of the method according to the present invention is that due to the channel equalization at the transmitting end and, respectively, adaptation of the frequency-specific subcarriers of the transmit signal to be sent out at the transmitting end to the frequency-selective transmission characteristics of the transmission medium which have been determined, all subcarriers of the transmit signal transmitted via the transmission medium have the same receive levels or, respectively, signal amplitude values. Thus the same signal power/noise power ratios S/N at the input of the second unit. In consequence, all subcarriers of the transmit signal can be modulated with the same number of modulation levels at the transmitting end so that maximum utilization of the transmission resources of the individual subcarriers of the transmit signal, and thus maximum utilization of the transmission resources of the transmission medium is achieved. Due to the fact that the subcarriers of the transmit signal are modulated with the same number of modulation levels, the expenditure for controlling the modulation and demodulation and, especially, the overhead in transmitting the modulation and demodulation control information, for example via a separate control channel of the transmission medium, is minimized. Advantageously, the frequency-selective channel equalization according to the present invention at the transmitting end prevents the increase in level of the noise signal duly caused in the case of channel equalization at the receiving end and associated with an increase in bit error probability.

According to an advantageous embodiment of the method according to the present invention, the frequency-selective transmission characteristics of the transmission medium are determined in the second unit and frequency-specific subcarriers of another transmit signal formed with the aid of a multicarrier method and transmitted from the second unit to the first unit are adapted to the frequency-selective transmission characteristics of the transmission medium which have been determined. By determining the frequency-selective transmission characteristics both in the first unit and in the second unit, the channel equalization of the transmit signal at the transmitting end can be advantageously implemented both in the downstream direction and in the upstream direction, as a result of which the utilization of the available transmission resources of the transmission medium arranged between the first unit and the second unit is further improved.

The frequency-selective transmission characteristics are advantageously determined with the aid of the transmit signal transmitted to the first unit and, respectively, second unit via the transmission medium, in which arrangement at least one subcarrier of the transmit signal is used for transmitting at least one pilot signal. Due to the transmission and evaluation of pilot signals at the receiving end, detection of the transmission characteristics of the transmission medium arranged between the first unit and the second unit can be achieved with little technical and economic expenditure. In particular, the transfer function H(f) of the transmission medium and, in particular, the absolute value of the transfer function |H(f)| can be determined in a particularly simple manner by evaluating received, frequency-selective pilot signals.

The at least one subcarrier of the transmit signal for transmitting the at least one pilot signal is advantageously modulated by a phase modulation method, wherein the pilot signal is a certain reference amplitude. Due to this advantageous embodiment, the subcarriers of the transmit signal utilized for the transmission of pilot signals are additionally used, at least partially, for transmission of useful information or, respectively, digital data streams. Thus, a further improvement in the utilization of the transmission resources of the transmission medium is achieved.

In the case of transmit signals having a large number of subcarriers, the transmission medium has virtually identical transmission parameters for adjacent subcarriers. According to a further advantageous embodiment of the method according to the present invention, the amplitude-specific and/or phase-specific transmission characteristics of adjacent subcarriers of the incoming transmit signal are averaged for determining the frequency-selective transmission characteristics of the transmission medium. Due to the advantageous averaging over the transmission characteristics of a number of subcarriers, arranged adjacently in the frequency domain, of the transmit signal which have been determined, the number of estimated values, thus the accuracy of the channel estimation at the transmitting end, is two-dimensionally increased without the spectral distance to adjacent subcarriers becoming too large.

In the case of fast time variations of the transmission media exhibiting transmission characteristics or, respectively, in the case of time-variant transmission media, time-selective, amplitude-specific and/or time-selective, phase-specific transmission characteristics of the transmission medium are determined according to a further advantageous embodiment of the method according to the present invention. Pursuant to such method, a number of frequency-selective, amplitude-specific and/or frequency-selective, phase-specific transmission characteristics, which are determined over a period of time, are stored in the respective unit and then the average over the stored frequency-selective, amplitude-specific and/or frequency-selective, phase-specific transmission characteristics is formed. Following this, the frequency-specific subcarriers of the transmit signal are adapted to the transmission characteristics of the transmission medium which are averaged over time. Due to the averaging over a number of frequency-selective transmission characteristics of the transmission medium which have been determined successively in time, the first derivation of the time variations of the transmission characteristics of the transmission medium is corrected during the detection of the transmission characteristics, which further improves the quality of the channel estimation at the transmitting end and the channel equalization at the transmitting end.

The frequency-selective transmission characteristics which have been determined are advantageously transmitted by the first unit to the second unit and the frequency-specific subcarriers of the further transmit signal are adapted to the transmitted transmission characteristics of the transmission medium in the second unit. Due to this advantageous variant of this embodiment, the transmission characteristics of the transmission medium arranged between the first unit and the second unit are only determined in one unit and the result of the determination is transmitted in parameterized form to the second unit as a result of which the expenditure for implementing the channel equalization at the transmitting end is kept low both in the first unit and in the second unit.

According to a further advantageous embodiment of the present invention, the signal power/noise power ratio S/N is determined for each subcarrier of the transmit signal in the determination of the frequency-selective transmission characteristics and the subcarriers are used for transmitting information (dsu, dsd) in dependence on the signal power/noise power ratio S/N determined in each case. In the case of a signal power/noise power ratio S/N measured below a limit value, the corresponding subcarrier is advantageously not used for transmitting information. Due to the deactivation of the subcarriers having, in each case, an inadequate signal power/noise power ratio S/N and thus not being usable for information transmission, the transmitting power of the remaining subcarriers used for information transmission can be correspondingly increased. Increasing the transmitting power of the subcarriers used for information transmission further reduces their bit error probability.

Additional features and advantages of the present invention are described in, and will be apparent from, the following Detailed Description of the Preferred Embodiments and the Drawings.

DETAILED DESCRIPTION OF THE PREFERRED EMBODIMENTS

Figure 1:
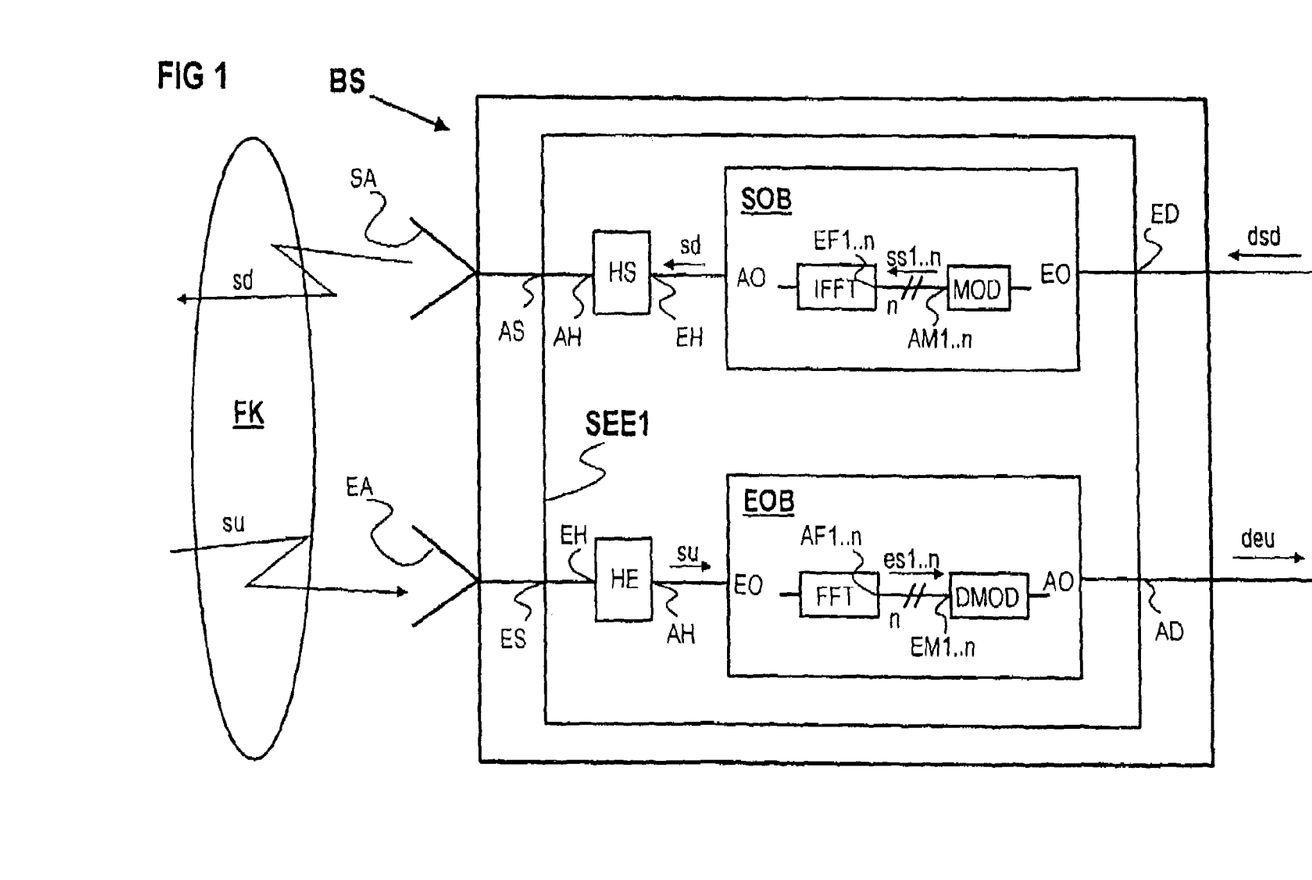
FIG. 1 shows a centralized transceiver unit implementing an OFDM transmission method.
Figure 2:
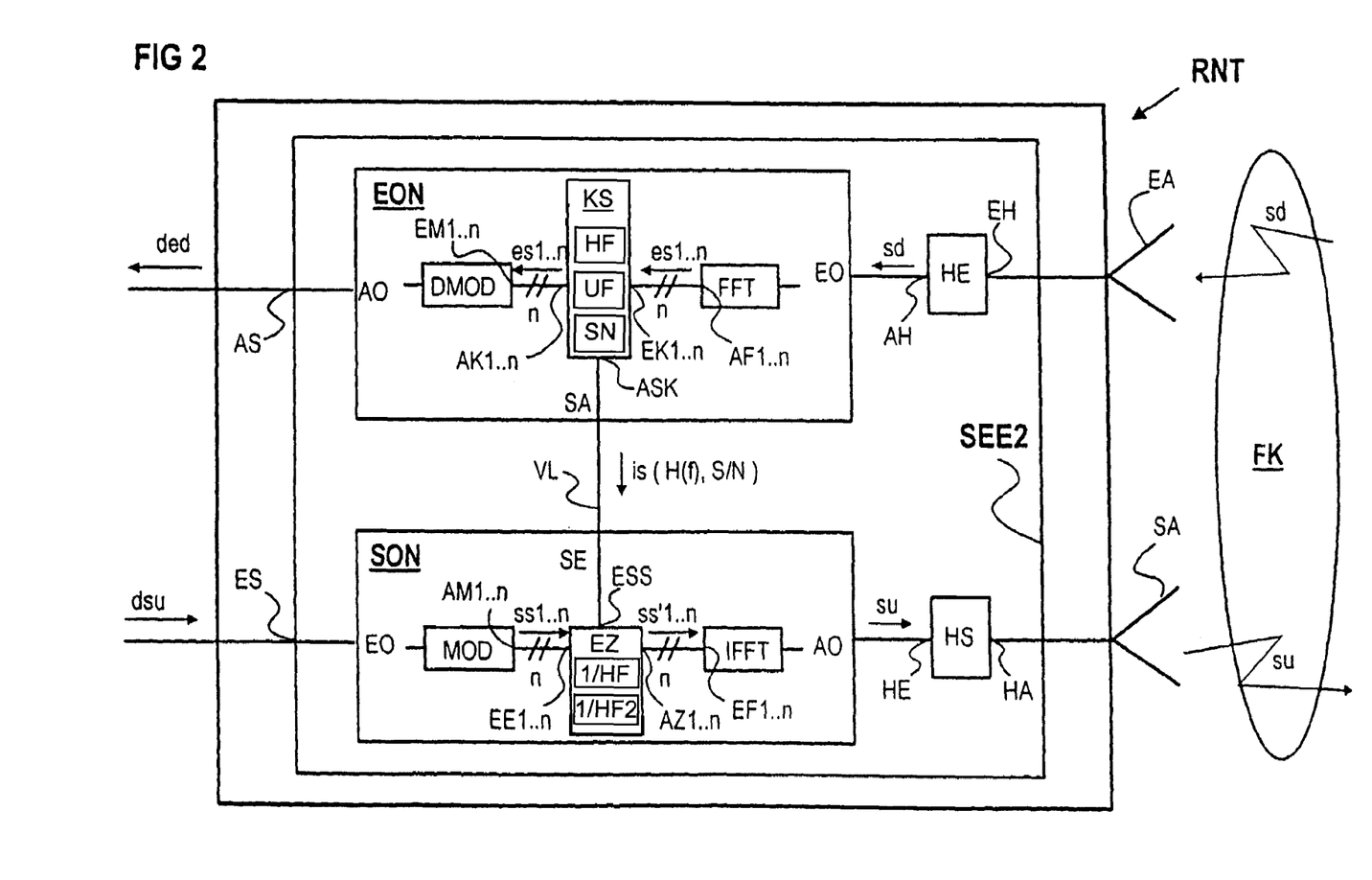
FIG. 2 shows a decentralized transceiver unit which is connected to a centralized transceiver unit according to FIG. 1 via the transmission medium "radio channel" and implements an OFDM transmission method.

FIGS. 1 and 2 in this case show a first and second transceiver unit SEE1,2 which can be, for example, modular components of transmitting and receiving systems implementing wireless communication networks. In the present exemplary embodiment, the first transceiver unit SEE1 shown in FIG. 1 is arranged in a base station BS representing the center of a radio cell or of a radio area (not shown) and the second transceiver unit SSE2 shown in FIG. 2 is arranged in a decentralized wireless network terminating unit RNT representing a wireless subscriber line unit. FIG. 2 only shows a wireless network terminating unit RNT as representative of decentralized network terminating units allocated to the base station BS or, respectively, the radio cell. To each decentralized wireless network terminating unit RNT, at least one decentralized communication terminal (not shown) an be connected which can be constructed, for example, as multimedia communication terminal or as ISDN-oriented telephone terminal. The decentralized wireless network terminating units RNT and the decentralized communication terminals connected to them can be connected to a higher-level communication network connected to the base station BS for example an ISDN-oriented landline network or a broadband-oriented multimedia communication network (not shown), via the wireless transmission medium "radio channel".

The first transceiver unit SEE1 shown in FIG. 1 has a data input ED to which a digital serial data stream dsd to be transmitted from the higher-level communication network to the decentralized wireless network terminating units RNT is conducted. The data input ED is connected to an input EO of an OFDM transmit unit SOB which is arranged in the first transceiver unit SEE1 and in which a method, already explained in the introduction to the description, for forming an OFDM signal sd having n subcarriers is implemented. The OFDM transmit unit SOB exhibits a modulator MOD which modulates the n subcarriers of the OFDM signal sd and which is connected via n outputs AM1 . . . n and n link lines to n frequency-selective inputs EF1 . . . n, associated with the n subcarriers of the OFDM signal sd, of a transformation unit IFFT for performing a discrete inverse fast Fourier transformation. The transformation unit IFFT is used for generating from the subcarrier-specific modulation symbols or, respectively, transmit symbols SS1 . . . n conducted from a modulator MOD to the frequency-selective inputs EF1 . . . n of the transformation unit IFFT a discrete-time OFDM signal. In the OFDM transmit unit SOB, other units (not shown) such as parallel/serial converters, digital/analog converters, filter units, and amplitude limiters, for converting the discrete-time OFDM signal into the analog OFDM signal sd, for example by adhering to spectrum masks defined for wireless communication networks or mobile radio systems and stipulated by ETSI standardization, are arranged. The OFDM transmit unit SOB is connected via an output AO to an input EH of a radio-frequency transmit unit HS which is connected via an output AH and via an antenna output AS of the first transceiver unit SEE1 to a transmit antenna SA arranged in the external area of the base station BS. The analog OFDM transmit signal sd is amplified by a transmit amplifier, not shown, arranged in the radio-frequency transmit unit HS, is mixed into the radio-frequency or RF band and subsequently transmitted via the transmit antenna SA and via the wireless transmission medium "radio channel" to the decentralized network terminating units RNT arranged in the radio cell of the base station BS (also called the downstream direction).

Furthermore, an OFDM receiving unit EOB is arranged in the first transceiver unit SEE1, which is connected via an input EO to an output AH of a radio-frequency receiving unit HE. The radio-frequency receiving unit HE has an input EH which is connected to a receiving antenna EA arranged in the external area of the base station BS, via an antenna input ES of the first transceiver unit SEE 1. An OFDM signal su transmitted by a decentralized network terminating unit RNT to the base station BS and received at the receiving antenna EA of the base station BS is down converted to the intermediate-frequency band or, respectively, the baseband by a conversion device (not shown) arranged in the radio-frequency receiving unit HE and then forwarded to the input EO of the OFDM receiving unit EOB.

In the OFDM receiving unit EOB, a transformation unit FFT for implementing a discrete fast Fourier transform and having a number of frequency-selective outputs AF1 . . . n is arranged, each frequency-selective output AF1 . . . n being associated with one subcarrier of the received OFDM signal. After previous discretization and digitization with the aid of an analog/digital converter (not shown), the OFDM signal su received and down converted into the intermediate-frequency band or baseband, respectively, is transformed into the frequency domain with the aid of the fast Fourier transform implemented by the transformation unit FFT; i.e., the modulation symbols or receive symbols es1 . . . n of the respective subcarriers contained in the OFDM signal are determined and then forwarded to the corresponding frequency-selective outputs AF1 . . . n of the transformation unit FFT. The outputs AF1 . . . n of the transformation unit FFT are connected to n inputs EM1 . . . n of a demodulator DMOD via n link lines. From the receive symbols es1 . . . n forwarded to the demodulator DMOD from the transformation unit FFT, the corresponding receive code words transmitted via the respective subcarriers are determined with the aid of a demodulation method implemented in the demodulator DMOD. The receive code words which have been determined are then converted with the aid of a parallel/serial converter (not shown), associated with the OFDM receiving unit EOB, into a serial digital data stream deu which is forwarded, for example, to the higher-level communication network via a data output AD of the first transceiver unit SEE1.

The second transceiver unit SEE2, arranged in the decentralized wireless network terminating unit RNT according to FIG. 2, has an OFDM receiving unit EON which is connected via an input EO to an output AH of a radio-frequency receiving unit HE arranged in the second transceiver unit SEE2. The radio-frequency receiving unit HE is connected via an input EH to a receiving antenna EA arranged in the external area of the network terminating unit RNT. The OFDM signal sd transmitted by the base station BS to the network terminating unit RNT and received at the receiving antenna EA is down converted into the intermediate-frequency band or, respectively, the baseband by a conversion device (not shown), arranged in the radio-frequency receiving unit HE, and then forwarded to the input EO of the OFDM receiving unit EON. In the OFDM receiving unit EON, a transformation unit FFT for implementing a discrete fast Fourier transform and exhibiting a number of frequency-selective outputs AF1 . . . n is arranged, each frequency-selective output AF1 . . . n being associated with one subcarrier of the received OFDM signal sd. Using the fast Fourier transform implemented by the transformation unit FFT, the OFDM signal sd received and down converted into the intermediate-frequency band or baseband, respectively, is transformed into the frequency domain after previous discretization and digitization with the aid of an analog/digital converter (not shown); i.e., the modulation symbols or receive symbols es1 . . . n of the respective subcarriers contained in the received OFDM signal sd are determined and then forwarded to the corresponding frequency-selective outputs AF1 . . . n of the transformation unit FFT. The n outputs AF1 . . . n of the transformation unit FFT are connected via n link lines to n inputs EK1 . . . n of a channel estimation unit KS which is connected to corresponding frequency-selective inputs EM1 . . . n of a demodulator DMOD arranged in the OFDM receiving unit EON via n outputs AK1 . . . n and n link lines. The frequency-selective receive symbols es1 . . . n transmitted by the transformation unit FFT to the channel estimation unit KS are forwarded to the inputs EM1 . . . n of the demodulator DMOD. In the channel estimation unit KS, a first evaluating device UF is arranged via which the frequency-selective amplitude-specific transmission channel characteristics of the transmission medium "radio channel" are determined from the receive symbols es1 . . . n conducted to the channel estimation unit KS; i.e., the frequency-selective amplitude distortions (also called amplitude response or absolute value of the transfer function of the radio channel |H(f)|) caused by the transmission medium "radio channel" are determined for each subcarrier. Furthermore, the S/N ratio is determined for each subcarrier from the incoming receive symbols es1 . . . n via a further evaluating device SN arranged in the channel estimation unit KS. From the frequency-selective amplitude response |H (f)| determined and the frequency-selective S/N ratio determined, an information signal is transmitting the results of the determination is generated by a signal generating device (not shown), arranged in the channel estimation unit KS, which information signal is forwarded to a control output SA of the OFDM receiving unit EON via an output ASK of the channel estimation unit KS.

The frequency-selective receive symbols es1 . . . n forwarded to the demodulator DMOD from the channel estimation unit KS are converted into the receive code words transmitted via the respective subcarriers by a demodulation method implemented in the demodulator DMOD. From the receive code words determined, a serial/digital data stream ded is then formed with the aid of a parallel/serial converter (not shown), which is associated with the OFDM receiving unit EON, which data stream is conducted to a data output AS of the second transceiver unit SEE2 via an output AO of the OFDM receiving unit EON and is then transmitted, for example, to a decentralized destination communication terminal, not shown, which is connected to the decentralized network terminating unit RNT.

The control output SA of the second transceiver unit SEE2 arranged in the decentralized network terminating unit RNT is connected via a link line VL to a control input SE of an OFDM transmit unit SON arranged in the second transceiver unit SEE2, in which transmit unit a method for forming an OFDM signal su to be transmitted in the upstream direction and having n subcarriers is implemented. The OFDM transmit unit SON is connected via an input EO to a data input ES of the second transceiver unit SEE2 to which, for example, a digital serial data stream dsu to be transmitted from a decentralized communication terminal via the wireless transmission medium "radio channel" to the higher-level communication network is conducted. The digital serial data stream dsu is divided into n parallel sub-data streams, or converted in parallel form, respectively, by a serial/parallel converter (not shown), which is associated with the OFDM transmit unit SON, each of the n sub-data streams being allocated to one of the n subcarriers of the OFDM signal. The n parallel sub-data streams are conducted to a modulator MOD arranged in the OFDM transmit unit SON and modulating the n subcarriers of the OFDM signal os, the incoming n sub-data streams being converted into n frequency-selective modulation symbols or transmit symbols ss1 . . . n associated with the n subcarriers of the OFDM signal by a modulation method implemented in the modulator MOD. The n frequency-selective transmit symbols ss1 . . . n formed are forwarded to n outputs AK1 . . . n of the modulator MOD which is connected to n frequency-selective inputs EE1 . . . n of a channel equalizer unit EZ, which are associated with the n subcarriers of the OFDM signal su. The channel equalizer unit EZ has a control input ESS which is connected to the control input SE of the OFDM transmit unit SON and is thus connected to the output ASK of the channel estimation unit KS arranged in the OFDM receiving unit EON via the link line VL.

The channel equalizer unit EZ has capabilities for adapting the transmit symbols ss1 . . . n formed by the modulator MOD and forwarded to the channel equalizer unit EZ to the frequency-selective amplitude-specific transmission channel characteristics of the transmission medium "radio channel" determined in the OFDM receiving unit EON (also called "equalization of the amplitude response" or "amplitude equalization"); i.e., the amplitudes of the frequency-selective transmit symbols ss1 . . . n are corrected in dependence on the information signal transmitted to the control input ESS. For example, the frequency-selective transmit symbols ss1 . . . n are multiplied by the inverse of the absolute value of the transfer function of the radio channel determined, in this case 1/|H(f)|. The n corrected frequency-selective transmit symbols ss'1 . . . n are forward to n outputs AZ1 . . . n of the channel equalizer unit EZ which are connected to corresponding n frequency-selective inputs EF1 . . . n, allocated to the n subcarriers of the OFDM signal, of a transformation unit IFFT for performing a discrete inverse fast Fourier transformation. Using the transformation unit IFFT, a discrete-time OFDM signal is calculated from the subcarrier-specific and corrected transmit symbols ss'1 . . . n forwarded from the channel equalizer unit EZ to the frequency-selective inputs EF1 . . . n of the transformation unit IFFT. In the OFDM transmit unit SON, further units (not shown), such as parallel/serial converters, digital/analog converters, filter units, and amplitude limiters, for converting the discrete-time OFDM signal into an analog OFDM transmit signal su, for example by adhering to the aforementioned ETSI spectrum masks, are arranged. The OFDM transmit unit SON is connected via an output AO to an input EH of a radio-frequency transmit unit HS which is connected to a transmit antenna SA arranged in the external area of the decentralized network terminating unit RNT via an output AH and via an antenna output AS of the second transceiver unit SEE2. The analog OFDM transmit signal su is amplified by a transmit amplifier, not shown, which is arranged in the radio-frequency transmit unit HF, is converted into the radio-frequency band or RF band and then transmitted to the base station BS via the transmit antenna SA and via the wireless transmission medium "radio channel" in the upstream direction.

It should be noted that the exemplary embodiment described only represents a functional description of the method according to the present invention; i.e., the embodiment of the first and second transceiver unit SEE1,2 described in the exemplary embodiment can also be implemented by alternative variants of the embodiment. For example, the radio-frequency transmitting unit and receiving unit HS, HE arranged in each case in a transceiver unit SEE1,2 can be replaced by a radio-frequency converter unit (not shown), where the respective transmitting and receiving paths are separated via a switch, not shown.

In the text which follows, the method according to the present invention for maximum utilization of the transmission resources provided by the wireless transmission medium "radio channel" is explained in greater detail.

The radio-frequency transmitting and receiving units HS, HE arranged in the first and second transceiver unit SEE1,2 are designed in such a manner that OFDM signals sd, su transmitted in the downstream and upstream direction are transmitted in the TDD (time division duplex) transmission method. In the TDD transmission method, the information to be transmitted between the base station BS and the wireless decentralized network terminating units RNT are alternately transmitted with the aid of signal bursts of a particular extent in time which are sent out in the same frequency range. In this method, the transceiver units SEE1,2 arranged in the network terminating units RNT and in the base station BS are alternately switched to transmit and receive mode. When the TDD transmission method is used, the wireless transmission medium "radio channel" exhibits reciprocal characteristics. That is, the OFDM signal sd sent out in bursts in the downstream direction by the base station BS and received by a decentralized network terminating unit RNT, it is possible to determine or, respectively, estimate the frequency-selective amplitude-specific and/or phase-specific transmission channel characteristics of the transmission medium "radio channel" for the OFDM signal su to be transmitted in the upstream direction by the decentralized network terminating unit RNT.

According to a first variant of the embodiment of the method according to the present invention, a differential phase modulation method (differential phase shift keying, for example a 64 DPSK), is implemented in the modulator MOD arranged in the OFDM transmit unit SOB of the first transceiver unit SEE1. When a differential modulation method is used, no carrier recovery of the received OFDM signal sd and no precise recovery of the bit clock is required in the subsequent demodulation in the corresponding OFDM receiving unit EON or, respectively, the demodulator DMOD arranged therein. To provide for a determination of the frequency-selective transmission characteristics of the transmission medium "radio channel", also called channel estimation in the text which follows, at the receiving end, the modulator MOD arranged in the base station BS is designed in such a manner that a particular number of the transmit symbols ss1 . . . n present at the n outputs AM1 . . . n of the modulator MOD are designed as pilot symbols with defined reference amplitude; i.e., some of the subcarriers of the OFDM signal sd to be transmitted in the downstream direction are used for transmitting in each case a pilot tone or pilot signal having a defined reference amplitude. For example, 10% of the subcarriers of the OFDM signal sd, which can be used for information transmission, are used for transmitting pilot tones.

From the OFDM signal received at the receiving antenna EA of the network terminating unit RNT, the transmitted receive symbols es1 . . . n of the respective subcarriers of the received OFDM signal sd are determined by the transformation unit FFT arranged in the OFDM receiving unit EON and forwarded to the channel estimation unit KS.

From the receive symbols es1 . . . n present at the inputs EK1 . . . n and designed as pilot symbols, the frequency-selective, amplitude-specific transmission characteristics or frequency-selective attenuation characteristics of the transmission medium "radio channel" FK arranged between the base station BS and the decentralized wireless network terminating unit RNT are determined. That is, the amplitude response or absolute value of the transmission function |H(f)| of the transmission medium "radio channel" FK is determined by the first evaluating device HF arranged in the channel estimation unit KS. With the aid of the information signal is, the transmission characteristics of the transmission medium "radio channel" FK which have been determined are then transmitted to the control input SE of the OFDM transmitting unit SON arranged in the decentralized network terminating unit RNT via the link line VL. Furthermore, the receive symbols es1 . . . n forwarded from the channel estimation unit KS to the n inputs EM1 . . . n of the demodulator DMOD are converted in the OFDM receiving unit EON, with the aid of the differential or, respectively, incoherent demodulation method implemented in the demodulator DMOD, into the receive code words transmitted via the respective subcarriers of the OFDM signal sd, from which code words the serial digital data stream ded conducted to the output AS of the second transceiver unit SEE2 is formed.

According to the present invention, the OFDM signal to be transmitted to the base station BS in the upstream direction is generated depending on the transmission channel characteristics of the transmission medium "radio channel" determined by the OFDM receiving unit EON and forwarded to the OFDM transmitting unit SON. For this purpose, the digital serial data stream dsu received at the input EO of the OFDM transmitting unit SON arranged in the second transceiver unit SEE2 and to be transmitted to the base station BS is converted into parallel form and converted into the transmit symbols ss1 . . . n associated with the n subcarriers of the OFDM signal, with the aid of the modulator MOD. The transmit symbols ss1 . . . n formed are forwarded to the n inputs EE1 . . . n of the channel equalizer unit EZ and adapted to the frequency-selective amplitude-specific transmission channel characteristics of the transmission medium "radio channel" FK, which have been determined by the correction device 1/HF arranged in the equalizer unit (also called amplitude equalization at the transmitting end). The amplitude equalization at the transmitting end implemented by the correction device 1/HF takes place in such a manner that the transmit symbols ss1 . . . n of the individual subcarriers of the OFDM signal su are multiplied by a factor representing the absolute value of the inverse of the transfer function $H_n(f)$ determined. In this case, $1/|H_n(f)|$ for $0 \leq n \leq N-1$, wherein n represents the length of the Fourier transform implemented in the transformation unit IFFT and $H_n(f)$ represents the transfer function of the nth subcarrier of the OFDM signal.

The frequency-selective amplitude equalization according to the present invention, at the transmitting end, which has been described, has the effect that all subcarriers of the OFDM signal su transmitted to the base station BS from the decentralized network terminating unit RNT in the upstream direction have the same receive levels or signal amplitude values when they arrive at the receiving antenna EA of the base station BS. Since all subcarriers of the OFDM signal su received in the base station BS have the same receive level, the signal power/noise power ratio S/N is identical for all subcarriers. Thus, all subcarriers can be modulated with the same number of modulation levels at the transmitting end; i.e., with the aid of the OFDM transmitting unit SON arranged in the decentralized network terminating unit RNT or, respectively, with the aid of the modulator MOD arranged there. This achieves maximum utilization of the transmission resources of the individual subcarriers of the OFDM signal su. For example, if the decentralized network terminating units RNT are arranged close to the base station BS, the individual subcarriers of the OFDM signal su to be transmitted to the base station BS in the upstream direction can be modulated with the aid of the 64-QAM (quadrature amplitude modulation). As the distance between the decentralized network terminating unit RNT and the base station BS increases, i.e. with increasing attenuation characteristics of the transmission medium "radio channel" FK, the number of modulation levels is reduced. Due to the identical S/N ratio of the subcarrier of the OFDM signal su received in the base station BS, no subcarrier-individual number of modulation levels is required for controlling the demodulation of the received OFDM signal so that the control effort for modulating and demodulating the OFDM signal su is advantageously minimum. By avoiding the requirement of subcarrier-individual number of modulation levels, no additional overhead is generated for transmitting additional control information controlling the subcarrier-individual modulation and demodulation, thus preventing the transmission capacity of the transmission medium "radio channel" from being reduced.

As an alternative, the transmission power of the OFDM signal su to be sent out can be correspondingly reduced instead of increasing the number of modulation levels of the OFDM signal su to be sent in the upstream direction. The transmission power can be lowered, for example, in the radio-frequency transmit unit HS of the decentralized network terminating unit RNT. Lowering the transmission power minimizes the mutual interference of the subcarriers of OFDM signals sd, su sent within a radio cell, also called intercell interference (ICI) and, as a result, the transmission capacity of the total system arranged within a radio cell is increased.

According to a further advantageous variant of the embodiment of the method according to the present invention, the channel estimation unit KS of the OFDM receiving unit EON arranged in the decentralized network terminating unit RNT has a further evaluating device SN for detecting the subcarrier-individual S/N ratios of the respective subcarriers of the received OFDM signal sd. The subcarrier-individual S/N ratios detected in each case with the aid of the further evaluating device S/N are additionally transmitted, in addition to the detected amplitude-specific transmission characteristics H(f) of the transmission medium FK with the aid of the information signal is via the link line VL to the OFDM transmitting unit SON arranged in the decentralized network terminating unit RNT or, respectively, to the channel equalizer unit EZ arranged there.

In the channel equalizer unit EZ a further correction device, (1/HF2), is arranged via which the subcarriers having unfavorable S/N ratios or the subcarriers having an S/N ratio which is measured below a limit value, are deactivated in dependence on the S/N ratios transmitted to the control input ESS, and thus are not used for information transmission. For example, in the case of decentralized network terminating units RNT which are at a large distance from the base station BS, only every second or fourth subcarrier of the OFDM signal su to be sent to the base station BS is used for information transmission, the transmission power of the subcarriers used for information transmission being correspondingly increased. Increasing the transmission power of the subcarriers used for information transmission further reduces the bit error probability. Deactivated subcarriers of the received OFDM signal can be detected by simple amplitude calculation in the OFDM receiving unit EON, EOB.

Since the determination of the frequency-selective amplitude-specific transmission characteristics of the transmission medium "radio channel" FK, implemented in the decentralized network terminating unit RNT at the transmitting end, only requires the evaluation of the amplitude value of the pilot symbols or pilot tones transmitted from the base station BS to the decentralized network terminating unit RNT by the channel estimation unit KS arranged in the decentralized network terminating unit RNT, the phase information of the pilot symbols or pilot tones of the OFDM signals sd, sent from the base station BS to the decentralized network terminating unit RNT, can be additionally used for transmitting the digital information dsd. The subcarriers of the OFDM signal sd which transmits pilot symbols or pilot tones can be modulated, for example, with the aid of an absolute or differential phase modulation method with defined reference amplitude as a result of which an advantageous utilization of the transmission capacity of the transmission medium "radio channel" is achieved.

The OFDM transmission units SOB, SON arranged in the base station BS or decentralized network terminating unit RNT or, respectively, the modulators MOD arranged there, are designed in such a manner that the subcarriers of the OFDM signals sd, su which are not used for the transmission of pilot tones are modulated with a coherent or absolute modulation method, for example an m-level QAM, since m-level QAM modulation methods can also be used in transmission media with unfavorable S/N ratios.

When coherent m-level modulation methods are used, additional methods (not shown) for the channel estimation or channel equalization at the receiving end, required according to the prior art, especially for phase equalization of the subcarriers received in each case of the received OFDM signal sd, su are required in the corresponding OFDM receiving units EON, EOB arranged in the base station BS and, respectively, the decentralized network terminating unit RNT. To provide for correction of the phase angles of the incoming subcarriers in the OFDM receiving unit EON, EOB, the first subcarrier of the OFDM signal sd, su is transmitted with a defined phase, e.g. $\phi=0$ degrees, by the OFDM transmitting unit SOB, SON. The phase of the first subcarrier is rotated by, for example, $\Delta\phi$ by the transmission medium "radio channel" FK. The second subcarrier arranged closely adjacently to the first subcarrier is also rotated by $\Delta\phi$ in this process. To restore the original phase angles of the transmitted OFDM signal sd, su, the second subcarrier must be multiplied by the complex factor $e^{-j\Delta\phi}$ by the correction device arranged in the OFDM receiving unit EON, EOB. The phase shift $\Delta\phi$ of the first subcarrier caused by the transmission medium "radio channel" FK can be detected, and the phase angle of the adjacent second subcarrier of the received OFDM signal can be correspondingly corrected with the aid of the correction device due to the pilot tone with defined transmitting phase transmitted via the first subcarrier. After the correction of the phase angle or phase equalization at the receiving end, the information transmitted via the second subcarrier is decided with the aid of the demodulator. The phase shift of the second subcarrier is determined in dependence on the result of the decision. The phase angle of the third subcarrier is then corrected in the manner described via the phase shift of the second subcarrier determined, etc.

According to a further advantageous embodiment of the method according to the present invention, the OFDM receiving unit EOB arranged in the base station BS also has a channel estimation unit KS, not shown, via which the receive symbols es1 . . . n transmitted with the aid of the received OFDM signal su are evaluated and, from this, the frequency-selective, amplitude-specific radio channel characteristics of the transmission medium "radio channel" FK are evaluated in the manner described and are transmitted via a link line (not shown), to a further channel equalizer unit (not shown), which is arranged in the OFDM transmitting unit SOB of the base station BS. Due to this advantageous embodiment, the OFDM signals sd to be transmitted to the decentralized network terminating units RNT from the base station BS in the downstream direction, and the subcarriers contained therein, can also be adapted to the transmission characteristics of the transmission medium "radio channel". The equalization of the amplitude response at the transmitting end achieved in this manner, both in the downstream direction and in the upstream direction, further improves the utilization of the transmission capacity of the transmission medium "radio channel" FK. However, this presupposes that some of the subcarriers of the OFDM signal su to be transmitted from the decentralized network terminating unit RNT to the base station BS are used for transmitting pilot symbols or pilot tones as already described. The modulator MOD arranged in the OFDM transmitting unit SON of the decentralized network terminating unit RNT is advantageously designed in such a manner that the subcarriers of the OFDM signal su which are used for the transmission of pilot symbols are modulated with the aid of a phase modulation method, for example a QPSK modulation methods with defined reference transmit amplitude. By using phase modulation, the pilot symbols or pilot tones transmitted in the upstream direction are also at least partially used for transmitting the digital data stream dsu.

To increase the accuracy of channel estimation in the decentralized network terminating unit RNT and possibly in the base station BS, the subcarriers of an OFDM signal sd, su which, in each case, transmit pilot tones or pilot symbols can be transmitted with increased power.

According to a further variant of the embodiment, the channel estimation at the transmitting end is only performed by the channel estimation unit KS arranged in the decentralized network terminating unit RNT and then the frequency-selective, amplitude-specific transmission characteristics of the transmission medium "radio channel" which have been determined are transmitted in parameterized form to the base station BS or, respectively, the OFDM transmitting unit SOB arranged there. The equalization of the amplitude response of the subcarriers of the OFDM signal sd to be transmitted in the downstream direction from the base station BS is carried out by a channel equalizer unit (not shown), which is arranged in the OFDM transmitting unit SOB of the base station BS, with the aid of the parameterized transmission characteristics transmitted.

Advantageously, only the changes of the transmission characteristics with time are transmitted to the base station BS and thus the overhead during the transmission of the transmission characteristics is minimized.

In the case of OFDM signals sd, su, having a large number of subcarriers, the transmission medium "radio channel" FK has virtually identical transmission characteristics for adjacent subcarriers. Advantageously, in addition to the directly adjacent subcarriers, the adjoining subcarriers in the frequency range are also taken into consideration for the determination of the frequency-selective transmission characteristics of the transmission medium or the channel estimation at the transmitting end performed in an OFDM receiving unit EON, EOB; i.e., an average is formed over determined transmission characteristics of a number of subcarriers arranged adjacently in the frequency range. The averaging has the advantage that the number of estimated values, and thus the accuracy of the channel estimation at the transmitting end is two-dimensionally increased without the spectral distance from adjacent subcarriers becoming too great.

According to a further advantageous embodiment of the method according to the present invention, in the case of radio channels exhibiting a fast change with time (also called time-variant transmission channels or radio channels), the OFDM signals following in time; i.e., those received at the receiving antenna EA within a certain period of time or, respectively, the receive symbols es1 . . . n contained therein, are also taken into consideration in the channel estimation implemented in the channel estimation unit KS. Implementation of this variant of the embodiment requires the storing of the receive symbols es1 . . . n received successively in time or storing of the frequency-selective transmission characteristics determined in each case, in a memory, not shown, which is arranged in the first or second transceiver unit SEE1, 2. Averaging over a number of receive symbols es1 . . . n in each case belonging to a subcarrier and received successively in time, within the channel estimation at the transmitting end performed in the channel estimation unit KS corrects the first generation of the changes with time of the transmission characteristics of the transmission medium "radio channel" FK during the detection of the transmission characteristics. Advantageously, the subcarriers arranged symmetrically about the current subcarrier in the frequency domain or, respectively, the receive symbols es1 . . . n transmitted via this subcarrier, are taken into consideration during the averaging. As an alternative, the averaging can also be done in the channel equalizer unit EZ of the OFDM transmitting unit SON.

The determination of the frequency-selective, amplitude-specific transmission characteristics of the transmission medium "radio channel" FK, performed with the aid of the evaluating device H(f) in the channel estimation unit KS, also called calculation of the estimated amplitude values, is relatively complex. The amplitude values of all received receive symbols es1 . . . n of an OFDM signal sd are calculated following the calculation rule $$\sqrt{I^2+Q^2}=\text{Amplitude}$$

where I is the imaginary part and Q is the real part of a received complex receive signal es1 . . . n. The respective frequency-selective estimated amplitude values can be calculated serially, at least partially, so that the technical complexity or hardware complexity for calculating the estimated amplitude values is kept low.

According to an advantageous embodiment, the estimated amplitude values are calculated from the frequency-selective receive symbols es1 . . . n received in each case, with the aid of values stored in a table called look-up table. For this purpose, the receive values of the imaginary part I and of the real part Q of a receive symbol es1 . . . n, which are in each case possible, are combined to form a table address and are stored in the look-up table. Furthermore, to each stored table address, the associated correction factor, $1/|H_n(f)|$ in this cases is allocated and stored in the corresponding table entry. The correction factors allocated to the respective table addresses represent the values by which the respective transmit symbols ss1 . . . n of the OFDM signal sd, su to be sent out are multiplied. The extent or, respectively, number of entries of the look-up table is advantageously kept small if it is restricted to one quadrant of the complex plane, transmit symbols ss1 . . . n having negative imaginary and real part values being inverted before the amplitude equalization at the transmitting end.

According to a further advantageous embodiment, the multiplication of the subcarriers or, respectively, of the transmit symbols ss1 . . . n to be transmitted via the subcarriers, by the correction factor determined, $1/|H_n(f)|$ in this case, is implemented by an addition or, respectively, subtraction with values also stored in a look-up table. This advantageous embodiment further reduces the computing effort for correcting the transmit symbols during the amplitude equalization.

Although the present invention has been described with reference to specific embodiments, those of skill in the art will recognize that changes may be made thereto without departing from the spirit and scope of the invention as set forth in the hereafter appended claims.

I claim as my invention:

1. A method for transmitting information via a transmission medium having particular transmission characteristics, with the aid of a multicarrier method, from a first unit to a second unit, the method comprising the steps of:
    using a first transmit signal to transmit the information, the first transmit signal exhibiting a plurality of frequency-specific subcarriers;
    determining, in the first unit, frequency-selective transmission characteristics of the transmission medium using a second transmission signal sent out by the second unit, the second transmission signal exhibiting at least one frequency-specific subcarrier;
    adapting, in the first unit, the plurality of frequency-specific subcarriers of the first transmit signal to the frequency-selective transmission characteristics of the transmission medium which have been determined;
    determining at least one of frequency-selective amplitude-specific transmission characteristics and frequency-selective phase-specific transmission characteristics of the transmission medium as the transmission characteristics; and
    averaging at least one of the frequency-selective amplitude-specific transmission characteristics and the frequency-selective phase-specific transmission characteristics of adjacent subcarriers of one of the first and second transmit signals for determining the frequency-selective transmission characteristics of the transmission medium.

2. A method for transmitting information as claimed in claim 1, the method further comprising the steps of:
    determining, in the second unit, the frequency-selective transmission characteristics of the transmission medium;
    adapting, in the second unit, to the frequency-selective transmission characteristics of the transmission medium which have been determined, a plurality of frequency-specific subcarriers of the second transmit signal formed with the aid of a multicarrier method and transmitted from the second unit to the first unit.

3. A method for transmitting information as claimed in claim 1, the method further comprising the step of:
    determining a transfer function of the transmission medium during the step of determining the frequency-selective transmission characteristics of the transmission medium.

4. A method for transmitting information as claimed in claim 3, the method further comprising the step of:
    representing the frequency-selective amplitude-specific transmission characteristics of the transmission medium by an absolute value of the transfer function which has been determined.

5. A method for transmitting information as claimed in claim 1, the method further comprising the steps of:
    determining the frequency-selective transmission characteristics using both the first and second transmit signals; and
    utilizing at least one subcarrier of one of the first and second transmit signals for transmitting at least one pilot signal.

6. A method for transmitting information as claimed in claim 5, the method further comprising the step of:
    modulating the at least one subcarrier using a phase modulation method for transmitting the at least one pilot signal, wherein the pilot signal exhibits a particular reference amplitude.

7. A method for transmitting information as claimed in claim 1, the method further comprising the steps of:
    determining at least one of time-selective amplitude-specific transmission characteristics and time-selective phase-specific transmission characteristics of the transmission medium;
    storing a plurality of the frequency-selective amplitude-specific transmission characteristics and frequency-selective phase-specific transmission characteristics, determined over a period of time, in the respective one of the first and second units;
    forming, in each case, an average value of the at least one of the stored frequency-selective amplitude-specific transmission characteristics and the frequency-selective phase-specific transmission characteristics; and
    adapting the subcarriers of the respective one of the first and second transmit signals to be transmitted to the transmission characteristics of the transmission medium which are averaged over time.

8. A method for transmitting information as claimed in claim 1, the method further comprising the steps of:
    transmitting the determined frequency-selective transmission characteristics from the first unit to the second unit; and
    adapting the frequency-specific subcarriers of the second transmit signal to the transmission characteristics of the transmission medium in the second unit.

9. A method for transmitting information as claimed in claim 8, wherein only changes with time of the transmission characteristics are transmitted by the first unit to the second.

10. A method for transmitting information as claimed in claim 4, the method further comprising the step of:
    multiplying subcarriers of the first and second transmit signals by one of an inverse of the determined transfer function and an inverse of the absolute value of:
    the determined transfer function in the adaptation of the first and second transmit signals to the transmission characteristics of the transmission medium.

11. A method for transmitting information as claimed in claim 1, wherein the first and second transmit signals transmitted between the first and second units are transmitted in a time division duplex transmission method.

12. A method for transmitting information as claimed in claim 2, the method further comprising the steps of:
    determining, in the determination of the frequency-selective transmission characteristics, a signal power/noise power ratio for each subcarrier of each of the first and second transmit signals; and
    utilizing the respective subcarrier of each of the first and second transmit signals for the transmission of information depending on the respective signal power/noise power ratio determined in each case.

13. A method for transmitting information as claimed in claim 12, wherein, with a signal power/noise power ratio measured below a limit value, the corresponding subcarrier is not utilized for transmitting information.

14. A method for transmitting information as claimed in claim 13, the method further comprising the step of:
    modulating all subcarriers of the first and second transmit signals which are not utilized for transmitting pilot signals by a same number of modulation levels, wherein the number of modulation levels is determined by a noise power/useful power ratio determined for the transmission medium.

15. A method for transmitting information as claimed in claim 1, wherein the multicarrier method is implemented by one of an orthogonal frequency division multiplex transmission method and a transmission method based on discrete multitones.

16. A method for transmitting information as claimed in claim 1, wherein the transmission medium is one of a wireless radio channel and a line-connected transmission channel.

17. A method for transmitting information as claimed in claim 16, wherein the information is transmitted via power supply lines.

18. A communication system for transmitting information, comprising:
- a first unit;
- a second unit; and
- a transmission medium having particular transmission characteristics, the transmission medium connecting the first and second units for the transmission of information between the first and second units;
- wherein the first unit includes:
  - a converter for converting, using a multicarrier method, the information to be transmitted into a first transmit signal having a plurality of frequency-specific subcarriers,
  - a transmitter for transmitting the transmit signal via the transmission medium to the second unit,
  - an evaluator for determining at least one of frequency-selective amplitude-specific transmission characteristics and frequency-selective phase-specific transmission characteristics of the transmission medium as the transmission characteristics and averaging at least one of the frequency-selective amplitude-specific transmission characteristics and the frequency-selective phase-specific transmission characteristics of adjacent subcarriers of the transmit signal for determining the frequency-selective transmission characteristics of the transmission medium, and
  - an adapter for adapting the frequency-specific subcarriers of the transmit signal to the frequency-selective transmission characteristics of the transmission medium.

19. A communication system as claimed in claim 18, wherein the second unit further includes a converter for converting, using a multicarrier method, the information to be transmitted into a second transmit signal exhibiting a plurality of frequency-specific subcarriers, an evaluator for determining the frequency-selective transmission characteristics of the transmission medium, an adapter for adapting the frequency-specific subcarriers of the second transmit signal to the frequency-selective transmission characteristics of the transmission medium which have been determined, and a transmitter for transmitting the second transmit signal via the transmission medium to the first unit.

20. A communication system as claimed in claim 18, wherein the evaluator is designed such that at least one of frequency-selective amplitude-specific transmission characteristics and frequency-selective phase-specific transmission characteristics of the transmission medium are determined as the transmission characteristics.

* * * * *